United States Patent
Liu et al.

(10) Patent No.: US 9,413,270 B2
(45) Date of Patent: Aug. 9, 2016

(54) SINGLE-PHASE THREE-WIRE POWER CONTROL SYSTEM AND POWER CONTROL METHOD THEREFOR

(71) Applicants: LITE-ON ELECTRONICS (GUANGZHOU) LIMITED, Guangzhou (CN); LITE-ON TECHNOLOGY CORPORATION, Taipei (TW)

(72) Inventors: Yung-Hsiang Liu, Taipei (TW); Tsai-Fu Wu, Chiayi County (TW); Chih-Hao Chang, Tainan (TW); Shun-Hung Lo, New Taipei (TW); Kai-Li Wang, Taipei (TW); Jeng-Gung Yang, Tainan (TW); Huan-Cheng Liu, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 42 days.

(21) Appl. No.: 14/596,730

(22) Filed: Jan. 14, 2015

(65) Prior Publication Data

US 2015/0207433 A1 Jul. 23, 2015

(30) Foreign Application Priority Data

Jan. 22, 2014 (TW) .............................. 103102292 A

(51) Int. Cl.
*H02M 3/335* (2006.01)
*H02M 7/5387* (2007.01)
*H02M 1/40* (2007.01)

(52) U.S. Cl.
CPC .............. *H02M 7/5387* (2013.01); *H02M 1/40* (2013.01); *H02M 7/53871* (2013.01)

(58) Field of Classification Search
CPC ............ H02M 3/33507; H02M 3/315; H02M 3/3155; H02M 3/25; H02M 3/335; H02M 7/5387; H02M 7/53871; H02M 7/515; H02M 7/53; H02M 7/538466; H02M 7/53862; H02M 7/57; H02M 7/79; G05F 1/30
USPC .......... 363/78, 95, 97, 131, 132; 323/239, 324
See application file for complete search history.

(56) References Cited

U.S. PATENT DOCUMENTS 6,282,111 B1 * 8/2001 Illingworth ....... H02M 7/53871
363/132

(Continued)

*Primary Examiner* — Adolf Berhane
(74) *Attorney, Agent, or Firm* — Li & Cai Intellectual Property (USA) Office

(57) ABSTRACT

The present disclosure provides a single-phase three-wire power control system integrating the electricity of a DC power supply device to an AC power source. The single-phase three-wire power control system comprises a single-phase three-wire inverter, a driving unit, a sampling unit and a processing unit. The single-phase three-wire inverter coupled between the DC power supply device and the AC power source converts a DC voltage of the DC power supply device to an output voltage. The driving unit is coupled to the single-phase three-wire inverter. The sampling unit samples the inductor current of an inductor of the single-phase three-wire inverter. The processing unit which is coupled to the driving unit and the sampling unit controls the single-phase three-wire inverter through the driving unit. The processing unit obtains the duty ratio according to the inductance of the inductor, the total variation of the inductor current, the DC voltage and the output voltage.

10 Claims, 16 Drawing Sheets

(56) References Cited

U.S. PATENT DOCUMENTS

| | | | | |
|---|---|---|---|---|
| 6,337,801 B2* | 1/2002 | Li | H02M 7/72 | 363/127 |
| 7,336,513 B1* | 2/2008 | Chen | H02M 7/538 | 363/132 |
| 2007/0109822 A1* | 5/2007 | Kuan | H02M 3/1588 | 363/21.14 |
| 2007/0211507 A1* | 9/2007 | Ilic | H02M 3/1584 | 363/132 |
| 2008/0013351 A1* | 1/2008 | Alexander | H02M 3/1582 | 363/123 |
| 2010/0097827 A1* | 4/2010 | Ben-Yaakov | H05B 41/2886 | 363/65 |
| 2012/0014138 A1* | 1/2012 | Ngo | H02M 3/33584 | 363/17 |
| 2012/0014151 A1* | 1/2012 | Alexander | H02M 5/225 | 363/123 |
| 2012/0153729 A1* | 6/2012 | Song | H02J 7/0013 | 307/82 |
| 2012/0176090 A1* | 7/2012 | Andrea | H02M 7/797 | 320/128 |
| 2013/0057200 A1* | 3/2013 | Potts | H02M 3/33584 | 320/107 |

* cited by examiner ($i_{LS}$ : 10A/div, $v_s$ : 200V/div, 2ms/div)

Time ($i_{LS}$ : 10A/div, $v_s$ : 200V/div, 2ms/div)

Time

SINGLE-PHASE THREE-WIRE POWER CONTROL SYSTEM AND POWER CONTROL METHOD THEREFOR

BACKGROUND OF THE INVENTION

1. Field of the Invention

The instant disclosure relates to an inverter; in particular, to a single-phase three-wire inverter.

2. Description of Related Art

Over the past decade the world is facing shortages of many natural resources, and the earth's greenhouse effect is increasingly serious. In order to solve these problems, green energy (e.g. solar energy) is gradually taken seriously. In the beginning, the green energy can reduce the burden of the power plants in rush hour. Further, the green energy source may replace the conventional power plants in order to reduce the production of the greenhouse gases. The technology of solar energy is developing in full swing. Solar panels are usually installed on the roof of the building or house without shelter, and the generated electric power can be integrated to the city power grid or stored in batteries. However, life-time of the battery is limited, and cost of utilizing battery is relatively expensive. Therefore, utilizing an inverter to integrate the electric power of solar energy to the power grid of the power company can reduce the power consumption of power transmission and reduce the power loss, which can improve the efficiency of the power generating system. Additionally, bi-directional function can be added to the inverter for integrating with DC power generating system, in which the generated electric power of the solar energy can be directly provided to DC electronic loads. Therefore, the electric power of the solar energy does not need to be integrated to the city power grid before being converted to DC power and waste of energy can be further reduced accordingly.

At present, many literatures disclose the related topology of the inverter, the controller and the practical functions, but the variation of the inductance (e.g. the inductance variation may be several times of the initial inductance) is still not considered. Due to the material of the iron core, the inductance would vary according to the current of the inductor, such that the current oscillation and the current ripple would be increased, and the precision of the current tracking would be affected thereto especially on the condition of large power, referring to FIG. 1 showing a curve diagram of inductance variation versus current. As shown in FIG. 1, for the system operating in larger power, the inductor can decrease as the current increases. If the controller does not take the variation of the inductance into account, the controller would need to introduce an excessively large compensation to overcome the insufficient inductance, thus there would be a risk of divergence for the system. Therefore, taking the variation of the inductance into account is indispensable for deriving the control law. Further, for the conventional controller of the inverter, the noise generated by switching of the switches often interferes sampling of the feedback signal, thus the controller may oscillate or get wrong functions accordingly. Although, an analog filter can be utilized to filter high frequency noise, the feedback signals would delay and response of the system would be slow, and it would result in distortion of the AC output of the inverter accordingly. Therefore, in recent years, industry and academia workers applies the digital single-chip to perform pulse width modulation control which samples multiple feedback signals in one duty cycle and averages these feedback signals to reduce the influence of high frequency noise. However, sampling multiple feedback signals may not make the feedback current match the reference current in practical, but the processing time of the single-chip is surely increased instead.

SUMMARY OF THE INVENTION

The object of the instant disclosure is to offer a single-phase three-wire power control system which permits variations of inductance. This system taking into account the variations of inductance can remedy the deficiencies of the conventional control.

In order to achieve the aforementioned objects, according to an embodiment of the instant disclosure, a single-phase three-wire power control system is provided. The single-phase three-wire power control system integrates the electricity of a DC power supply device to an AC power source through an inductor of a first power line, a second power line and a third power line. The single-phase three-wire power control system comprises a single-phase three-wire inverter, a driving unit, a sampling unit and a processing unit. The single-phase three-wire inverter is coupled between the DC power supply device and the AC power source for converting a DC voltage of the DC power supply device to an output voltage. The single-phase three-wire inverter has a first half-bridge DC-AC power converter and a second half-bridge DC-AC power converter parallel-coupled to each other. The driving unit is coupled to the single-phase three-wire inverter. The sampling unit is coupled to the inductor for sampling an inductor current of the inductor. The processing unit is coupled to the driving unit and the sampling unit for controlling the single-phase three-wire inverter through the driving unit and obtaining the duty ratio of a next cycle according to the inductance of the inductor, the total variation of the inductor current, the DC voltage and the output voltage. The processing unit obtains a current variation of exciting the inductor and a current variation of demagnetizing the inductor according to the DC voltage of a present cycle, the output voltage, the inductance of the inductor and the duty ratio of the present cycle, and obtains the total variation of the inductor current in the present cycle according to the current variation of exciting the inductor and the current variation of the demagnetized inductor in the present cycle.

In order to achieve the aforementioned objects, according to an embodiment of the instant disclosure, a power control method for controlling a single-phase three-wire power control system is provided. The single-phase three-wire power control system having a single-phase three-wire inverter. The single-phase three-wire inverter is coupled between a DC power supply device and a AC power source for converting a DC voltage of the DC power supply device to an output voltage and integrating the electricity of the DC power supply device to the AC power source through an inductor of a first power line, a second power line and a third power line. The single-phase three-wire inverter has a first half-bridge DC-AC power converter and a second half-bridge DC-AC power converter parallel-coupled to each other. The power control method comprises obtaining the duty ratio of a next cycle according to the inductance of the inductor, the total variation of the inductor current, the DC voltage and the output voltage; obtaining a current variation of exciting the inductor and a current variation of demagnetizing the inductor according to the DC voltage, the output voltage, the inductance of the inductor in a present cycle and the duty ratio of the present cycle; and obtaining the total variation of the inductor current in the present cycle according to the current variation of exciting the inductor and the current variation of demagnetizing the inductor in the present cycle.

In summary, the single-phase three-wire power control system and control method in this invention introduce the variation of inductor into the control mechanism for effectively reducing the current oscillation and the current ripple as well as increasing the accuracy current tracking. Also, the control mechanism only needs one sampling to obtain the average of the feedback current, the processing time of the processing unit (e.g. a single-chip) can be reduced, and the switching noise occurred when turning-on and turning-off of the switches can be avoided.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[An Embodiment of a Single-Phase Three-Wire Power Control System]

Figure 1:
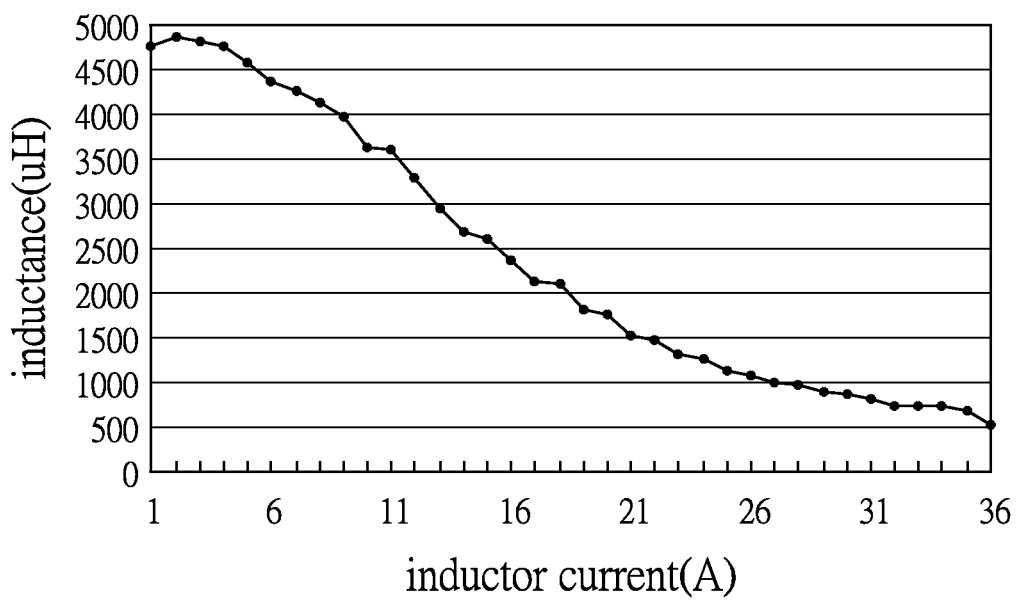
FIG. 1 shows a curve diagram of inductance variation versus current for a conventional magnetic moly-permalloy powder (MPP) core winding inductor.
Figure 2A:
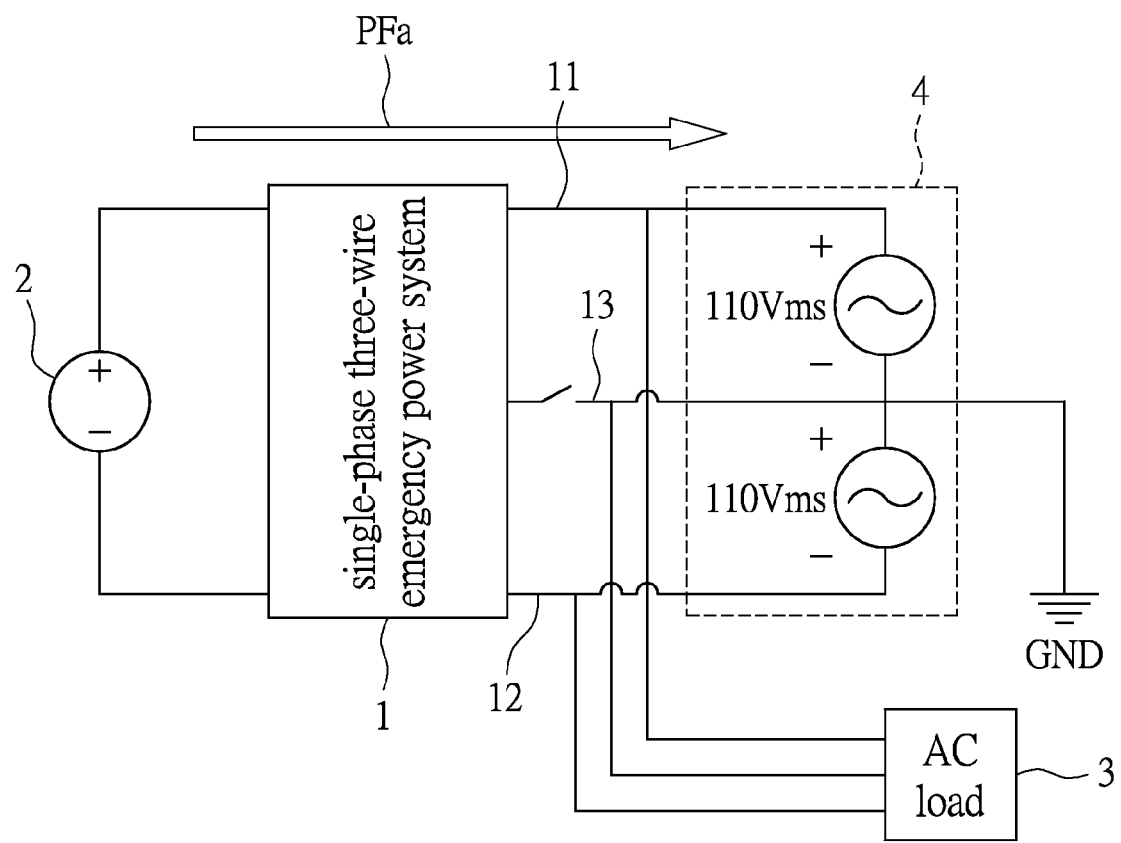
FIG. 2A shows a schematic diagram of a single-phase three-wire power control system operating in an grid-connection mode according to an embodiment of the instant disclosure.
Figure 2B:
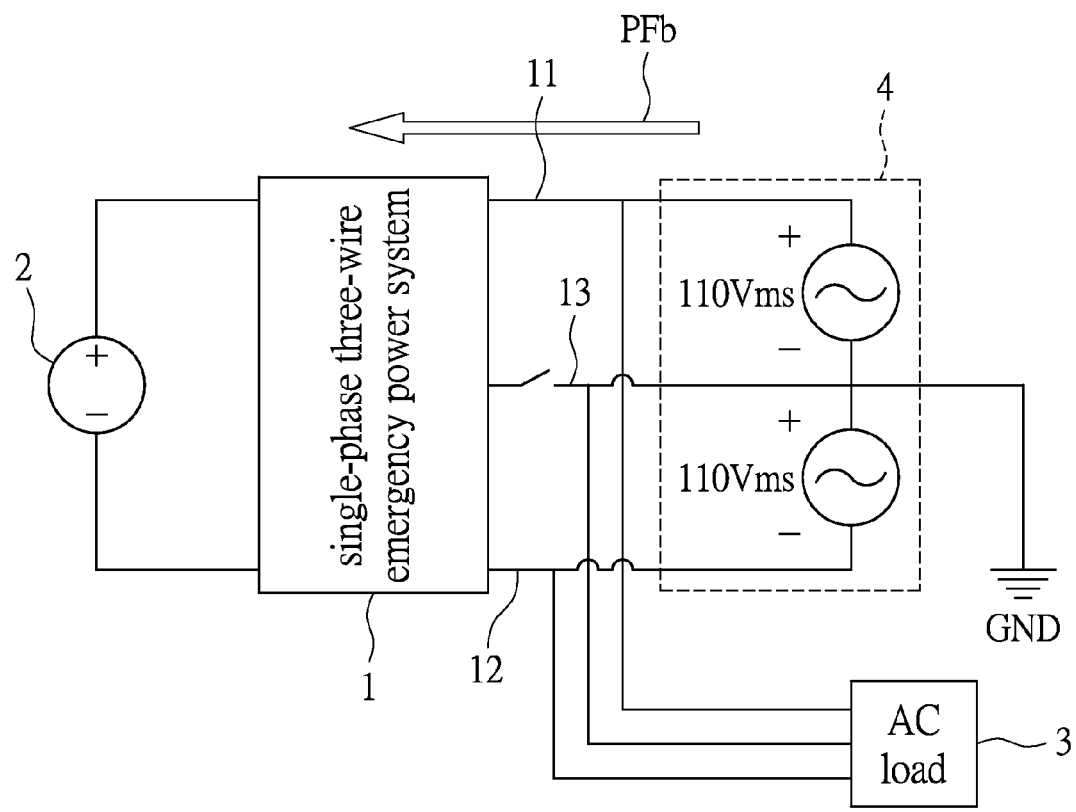
FIG. 2B shows a schematic diagram of a single-phase three-wire power control system operating in a rectification mode according to an embodiment of the instant disclosure.
Figure 2C:
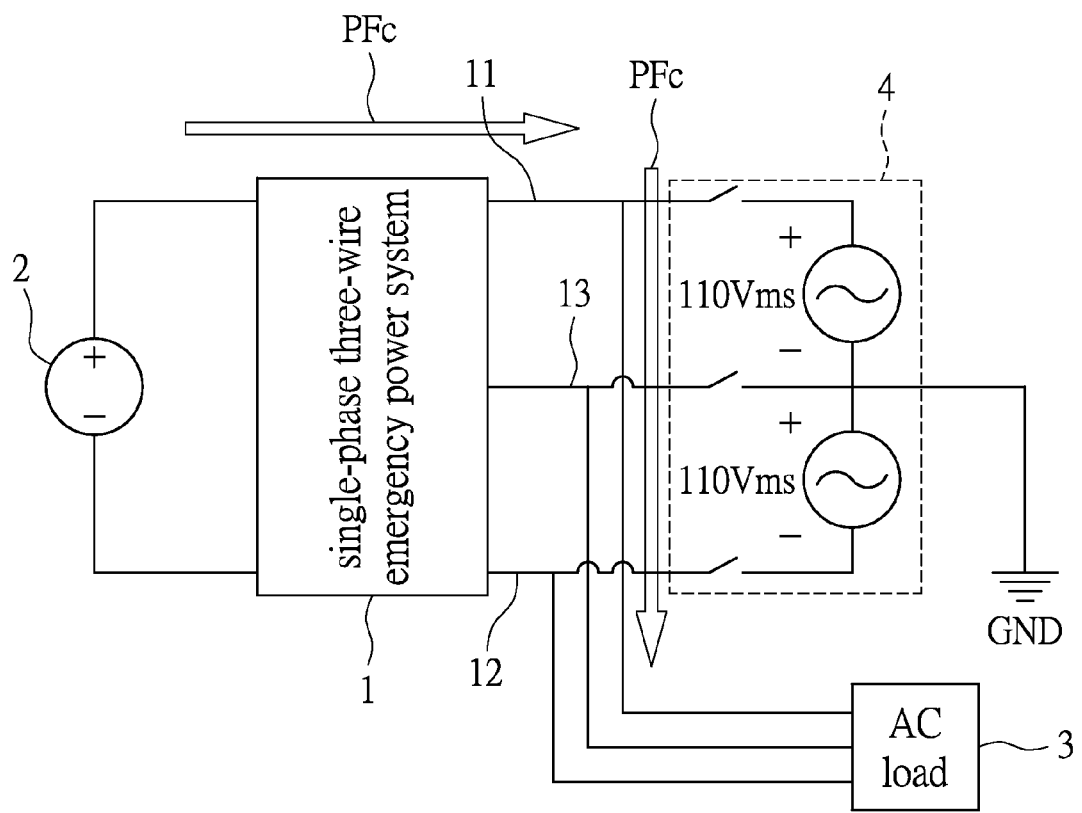
FIG. 2C shows a schematic diagram of a single-phase three-wire power control system operating in a voltage-control mode according to an embodiment of the instant disclosure.

Please refer to FIG. 2A in conjunction with FIG. 2B and FIG. 2C, a single-phase three-wire inverter in this embodiment can be a connection for regulating power between a DC power (e.g. a DC power supply device 2 in FIG. 2A) and an AC power (e.g. an AC power source 4 in FIG. 2A), such as a single-phase three-wire emergency power system 1 shown in FIG. 2A, FIG. 2B and FIG. 2C. The inverter in this embodiment may include a bi-directional inverter. The single-phase three-wire inverter disclosed in this embodiment can be operated in three modes comprising a grid-connection mode, a rectification mode and a voltage-control mode. The single-phase three-wire inverter can be an emergency power source connected to the utility grid. When the utility grid (i.e. power grid) is in normal operation, an AC load 3 is powered by the utility grid 4. And, when the energy of the DC link is sufficient, the grid-connection mode may be started, in which the power flow PFa represents that the DC power supply device 2 provides energy to the AC end as shown in FIG. 2A. When the energy of the DC link is insufficient, then the rectification mode is started, and the power flow PFb represents that the utility grid 4 provides energy to the DC power supply device 2 as shown in FIG. 2B. When the utility grid 4 fails, then the single-phase three-wire inverter goes to the voltage-control mode, meanwhile the system can function as an uninterruptible power supply (UPS), in which the power flow FPc represents that the DC power supply device 2 provides energy to the AC load 3 as shown in FIG. 3.

Figure 3:
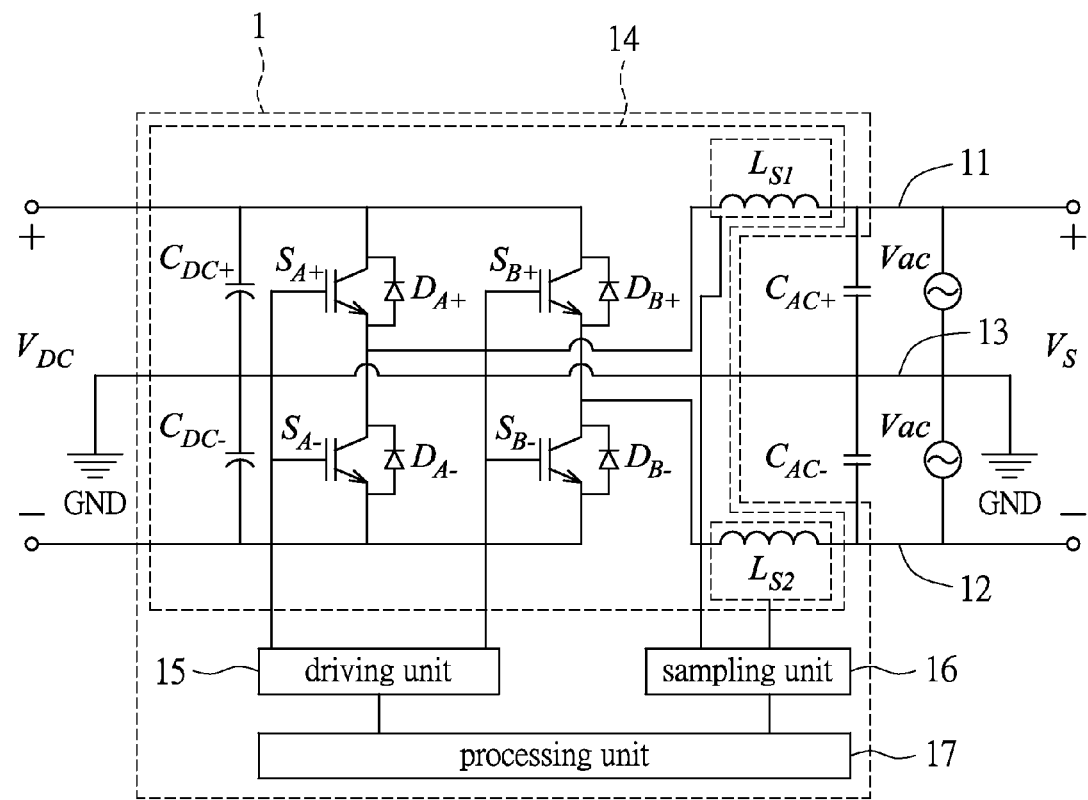
FIG. 3 shows a circuit block diagram of a single-phase three-wire emergency power system according to an embodiment of the instant disclosure.

Please refer to FIG. 2A in conjunction with FIG. 3, FIG. 3 shows a circuit block diagram of the single-phase three-wire emergency power system according to an embodiment of the instant disclosure. The power control system for the single-phase three-wire inverter (i.e. the single-phase three-wire emergency power system 1) integrates the electricity of the DC power supply device 2 to the AC power source 4 through an inductor of a first power line 11 (not shown in FIG. 2A, but represented by an inductor $L_{S1}$ of the first power line 11, a second power line 12 and a third power line 13. In this embodiment, the AC power source 4 is utility grid. The single-phase three-wire power control system comprises a single-phase three-wire inverter 14, a driving unit 15, a sampling unit 16 and a processing unit 17. The single-phase three-wire inverter 14 is coupled between the DC power supply device 2 and the AC power source 4 for converting a DC voltage $V_{DC}$ of the DC power supply device 2 to an output voltage $V_S$.

The single-phase three-wire inverter 14 has a first half-bridge DC-AC power converter and a second half-bridge DC-AC power converter parallel-coupled to each other. The first half-bridge DC-AC power converter is constituted of a power switch $S_{A+}$, a power switch $S_{A-}$ and the inductor $L_{S1}$ connected to the first power line 11. The second half-bridge DC-AC power converter is constituted of a power switch SB+, a power switch $S_{B-}$ and an inductor $L_{S2}$ connected to the second power line 12. The power switch $S_{A+}$ and the power switch $S_{A-}$ of the first half-bridge DC-AC power converter are coupled to the first power line 11 through the inductor $L_{S1}$. The power switch $S_{B+}$ and the power switch $S_{B-}$ of the second half-bridge DC-AC power converter are coupled to the second power line 12. Each of the power switches $S_{A+}$, $S_{A-}$, $S_{B+}$ and $S_{B-}$ is respectively parallel-connected to an inverted diode $D_{A+}$, $D_{A-}$, $D_{B+}$ and $D_{B-}$.

Regarding to the third power line, this inverter has three arms, in which a first arm comprises the power switches $S_{A-}$ and $S_{A-}$ connected in series, a second arm comprises the power switches $S_B$ and $S_{B-}$ connected in series, and a third arm comprises capacitors $C_{DC+}$ and $C_{DC-}$ connected in series. Switching of the third arm is utilized to compensate the unbalance of the load, wherein the first power line 11 and the third power line 13 represent an AC voltage, and the second power line 12 and the third power line 13 represent another AC voltage, thus the aforementioned two AC voltages can keep balanced when the power outage of utility grid is occurred. However, the current on the third power line 13 (also called the neutral line) is zero when the utility grid is normal.

The driving unit 15 is coupled to the power switches $S_{A-}$, $S_{A-}$, $S_{B+}$ and $S_{B-}$ of the single-phase three-wire inverter 14. The sampling unit 16 is coupled to the inductors $L_{S1}$ and $L_{S2}$ for sampling inductor currents of the inductors $L_{S1}$ and $L_{S2}$. The processing unit 17 is coupled to the driving unit 15 and the sampling unit 16. The processing unit 17 controls the power switches $S_{A+}$, $S_{A-}$, $S_{B+}$ and $S_{B-}$ of the single-phase three-wire inverter 14 through the driving unit 15. It is worth mentioning that the inductors $L_{S1}$ and $L_{S2}$ can be equivalent to an inductor $L_S$ shown in FIG. 4A. The processing unit 17 obtains a duty ratio D(n+1) of a next cycle according to the inductance of the inductor $L_S$, the total variation $\Delta I_{LS}$ of the inductor current, the DC voltage $V_{DC}$ and the output voltage $V_S$. The processing unit 17 obtains a current variation $\Delta i_{L1}$ of exciting the inductor and a current variation $\Delta i_{L2}$ of demagnetizing the inductor according to the DC voltage $V_{DC}$, the output voltage $V_S$, the inductance of the inductor $L_S$ of the present cycle and a duty ratio D(n) of the present cycle, and obtains the total variation $\Delta i_{LS}$ of the inductor current in the present cycle according to the current variation $\Delta i_{L1}$ of exciting the inductor and the current variation $\Delta i_{L2}$ of the demagnetized inductor in the present cycle. Please refer to the following descriptions for details of the control method.

The DC power supply device 2 of this embodiment may be a solar power generating device, a wind power generating device or other renewable power generating devices, in order to generate a small scale DC voltage $V_{DC}$. Additionally, the AC power source 4 may be a general household electricity system which is mainly for providing a single-phase AC voltage $V_S$. In practical, the ordinary skilled in the art will appreciate that circuit element such as capacitances $C_{AC+}$ and $C_{AC-}$ may be added for amending the non-ideal circuit characteristics when the inductors $L_{S1}$, $L_{S2}$ and the AC power source 4 are coupled practically.

The manner of the driving unit 15 controlling the power switches $S_{A+}$, $S_{A-}$, $S_{B+}$ and $S_{B-}$ is making the power switches $S_{A+}$, $S_{A-}$, $S_{B-}$ and $S_{B-}$ of the first half-bridge DC-AC power converter and the second half-bridge DC-AC power converter be both bipolarized switched.

Figure 4A:
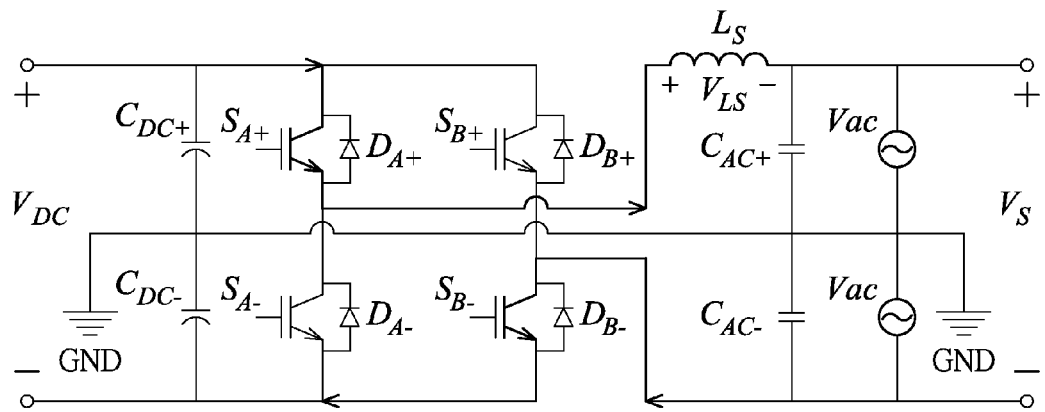
FIG. 4A shows a perspective diagram of a single-phase three-wire inverter operating during a positive half-cycle in an grid-connection mode according to an embodiment of the instant disclosure.
Figure 4B:
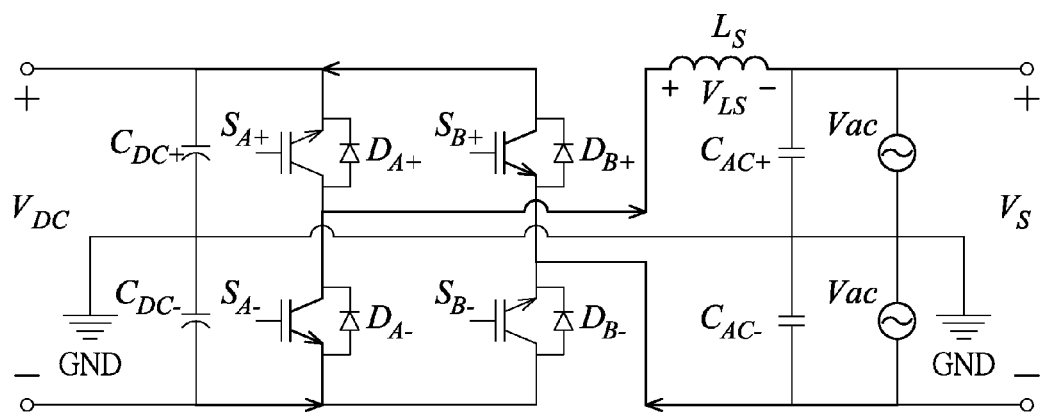
FIG. 4B shows a perspective diagram of a single-phase three-wire inverter operating during a negative half-cycle in an grid-connection mode according to an embodiment of the instant disclosure.

The control method in this embodiment is firstly considering the condition of each individual section of the operation, then integrating all the conditions of the individual sections of the operation. FIG. 4A shows a perspective diagram of the single-phase three-wire inverter operating during a positive half-cycle in a grid-connection mode according to an embodiment of the instant disclosure. At first, one switching cycle can be divided into two sections which are a section of exciting the inductor and a section of demagnetizing the inductor. Referring to the equation (1) and the equation (2) described in the following, and then adding these two current variations after respectively calculating the current variations of these two sections, the equation (3) in the following can be obtained.

In detail, when in the grid-connection mode, bipolarized switching is adopted to control the four power switches shown in FIG. 4A. While defining that the current flows from the left side of the inductor $L_S$ to the right side of the inductor $L_S$ is positive, the duty ratio of the power switch $S_{A+}$ and the power switch $S_{B-}$ is the duty ratio D, the duty ratio of the power switch $S_{A-}$ and the power switch $S_{B+}$ is the complementary (1-D) of the duty ratio D, and when the power switch $S_{A-}$ and the power switch $S_{B-}$ are conducted, the power switch $S_{A-}$ and the power switch $S_{B+}$ are cutoff, which causes the inductor $L_S$ to be excited, then the voltage drop $V_{LS}$ across the inductor $L_S$ is equal to $V_{DC}-V_S$. Otherwise, when the power switch $S_{A+}$ and the power switch $S_{B-}$ are cutoff, the power switch $S_{A-}$ and the power switch $S_{B+}$ are conducted, which causes the inductor $L_S$ to be demagnetized, then the voltage drop $V_{LS}$ across the inductor $L_S$ is equal to $-(V_{DC}+V_S)$. The relationships of voltage across the inductor and the current of the inductor are shown in equations (1) and (2), wherein D is the duty ratio.

$$\text{exciting the inductor: } V_{DC} - V_S = L_S \frac{\Delta i_{L1}}{DT_s} \tag{1}$$

$$\text{demagnetizing the inductor: } -(V_{DC} + V_S) = L_S \frac{\Delta i_{L2}}{(1-D)T} \tag{2}$$

As shown in the following equation (3), the total variation of the inductor current in the present cycle is the current variation of exciting the inductor added with the current variation of the demagnetized inductor.

$$\Delta i_{LS} = \Delta i_{L1} + \Delta i_{L2} \tag{3}$$

Taking the equation (1) and the equation (2) into the equation (3), and rearranging the equation (3) to obtain the equation (4), wherein T is a period and n is a positive integer representing the present period.

$$\Delta i_{LS} = \frac{T}{L}[(2D-1)V_{DC} + (-V_S)] \quad (4)$$

According to equation (4), the duty ratio D(n+1) characterized by following equation (5) can be obtained.

$$D(n+1) = \frac{1}{2} + \frac{V_S}{2V_{DC}} + \frac{L_S \Delta i_{LS}}{2V_{DC}T} \quad (5)$$

While utilizing current feedforward control, inductor's current variation $\Delta i_{LS}$ is equal to a reference current minus a feedback current, thus the current variation can be obtained, wherein the current variation in the equation (3) including a feedforward component $(I_{ref}(n+1)-I_{ref}(n))$ in a cycle and an error component $(I_{ref}(n)-I_{fb}(n))$, which can be characterized by equation (6).

$$\Delta i_{LS} = [i_{ref}(n+1) - i_{ref}(n)] + K_P[i_{ref}(n) - i_{fb}(n)] \quad (6)$$

For example, when Kp=1, $\Delta i_{LS}$ in equation (6) can be indicated by the reference current minus the feedback current, thus equation (5) can be rewritten by equation (7).

$$D(n+1) = \frac{1}{2} + \frac{V_S}{2V_{DC}} + \frac{L_S[i_{ref}(n+1) - i_{fb}(n)]}{2V_{DC}T} \quad (7)$$

Figure 6:
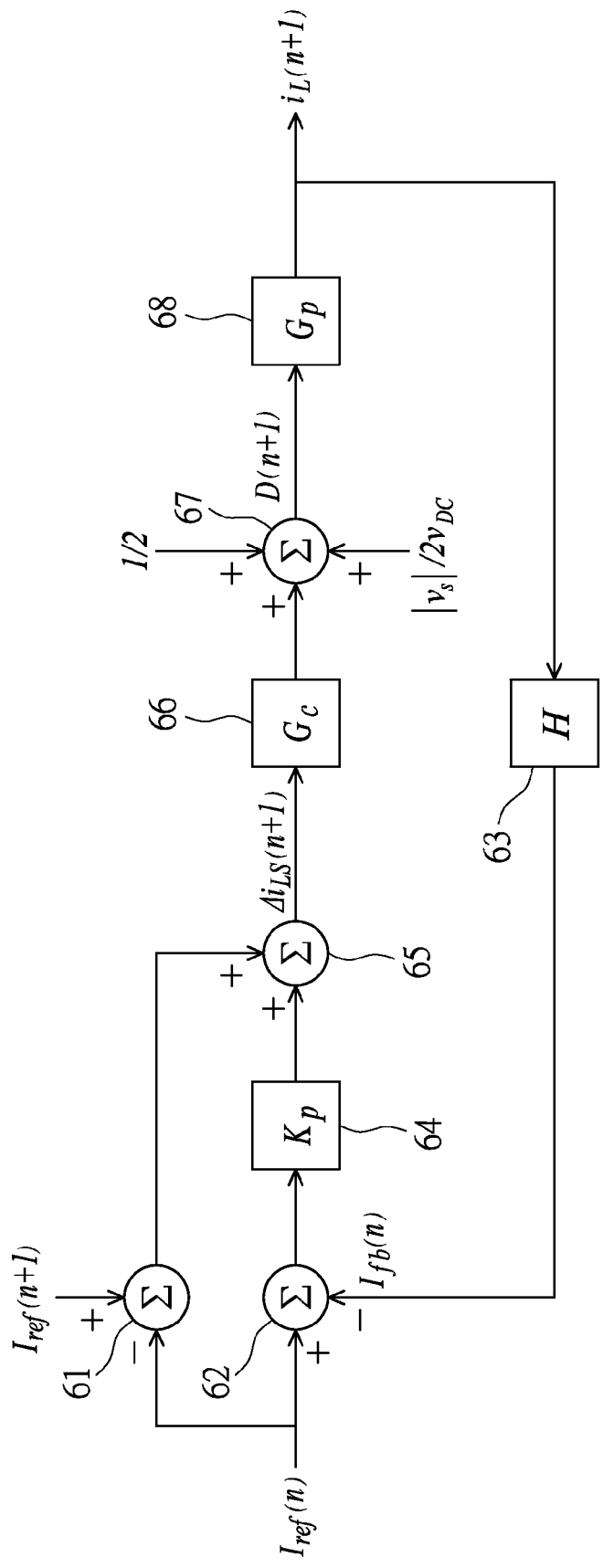
FIG. 6 shows a control block diagram of a single-phase three-wire inverter operating in an grid-connection mode and a rectification mode according to an embodiment of the instant disclosure.

In other words, the processing unit 17 utilizes the current feedforward control and according to the reference current (comprising the reference current $I_{ref}(n+1)$ of the next cycle and the reference current $I_{ref}(n)$ of the present cycle) and the feedback current $I_{fb}(n)$ of the present cycle to obtain the inductor's total current variation $\Delta i_{LS}$, wherein the feedback current is the inductor current multiplied with a ratio factor H. The control block for the grid-connection mode and the rectification mode is shown in FIG. 6. Then, please refer to following description about the rectification mode.

Regarding the rectification mode, the rectification mode can have the function of power factor correction. The derivation of the control low of the rectification mode is the same as that of the grid-connection mode, referring to following equation (8) and equation (9).

$$\text{exciting the inductor: } V_{DC} + V_S = L_S \frac{\Delta i_{L1}}{DT_s} \quad (8)$$

$$\text{demagnetizing the inductor: } V_S - V_{DC} = L_S \frac{\Delta i_{L2}}{(1-D)T} \quad (9)$$

Referring to equation (3) again, the total variation of the inductor current in the present cycle is the current variation of exciting the inductor added with the current variation of the demagnetized inductor.

And, taking equation (8) and equation (9) into equation (3) to obtain equation (10). Further, solving for the duty ratio D, and then equation (11) is obtained.

$$\Delta i_{LS} = \frac{(V_{DC} - V_S)DT}{L_S} + \frac{(V_S - V_{DC})(1-D)T}{L_S} \quad (10)$$

$$D(n+1) = \frac{1}{2} - \frac{V_S}{2V_{DC}} + \frac{L_S \Delta i_{LS}}{2V_{DC}T} \quad (11)$$

While utilizing the current feedforward control, the inductor's current variation $\Delta i_{LS}$ is equal to the reference current $i_{ref}(n+1)$ minus the feedback current $i_{fb}(n)$, thus equation (11) can be rewritten as equation (12).

$$D(n+1) = \frac{1}{2} - \frac{V_S}{2V_{DC}} + \frac{L_S[i_{ref}(n+1) - i_{fb}(n)]}{2V_{DC}T} \quad (12)$$

Referring to the control block shown in FIG. 6, wherein $$K_P = 1,$$

$$G_C = \frac{L_S(i_{LS})}{2V_{dc}T},$$

$$G_P(s) = \frac{i_{LS}}{d} = \frac{V_{dc}}{sL_S + r_L},$$

$r_L$ is the resistance of the inductor L, and H represents the scale factor.

Figure 5:
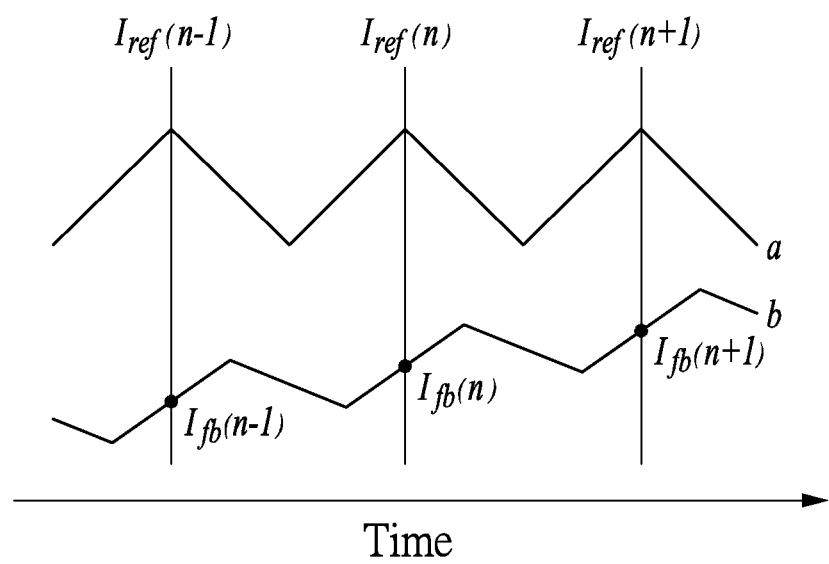
FIG. 5 shows a waveform of triangular wave for a symmetrical carrier according to an embodiment of the instant disclosure.

Additionally, as shown in FIG. 5, regarding to current sampling, the chip of the processing unit is selected to operate a triangular wave mode with a symmetrical carrier, the output duty ratio of pulse width modulation will have a symmetrical distribution about a central point (i.e. the peak) of the triangular wave, then the average of the inductor current within the cycle can be equal to the reference current. Curve "a" is a built-in triangular wave of the processing unit, and curve "b" is an inductor current $I_L$. Therefore, when sampling the feedback current at the central point (which is the peak) of the triangular wave (of the curve "a"), the feedback current will be accurately match with the reference current, and it only needs sampling once. Additionally, in the triangular wave mode, sampling at the central point may make the sampling point avoid the switching noise occurred when turning-on and turning-off of the switches.

The control block shown in FIG. 6 is executed by the processing unit 17, and details are described in the follows. Please refer to equations (7) and (12) in conjunction with FIG. 6, FIG. 6 shows a control block diagram of a single-phase three-wire inverter operating in an grid-connection mode and a rectification mode according to an embodiment of the instant disclosure. Firstly, utilizing a subtractor 61 to subtract the reference current $I_{ref}(n)$ of the present duty cycle from the reference current $I_{ref}(n+1)$ of the next duty cycle to obtain a feedforward component $(I_{ref}(n+1)-I_{ref}(n))$. Then, utilizing a subtractor 62 to subtract the sampled feedback current $I_{fb}(n)$ from the reference current $I_{ref}(n)$ of the present duty cycle to obtain the error component $(I_{ref}(n)-I_{fb}(n))$, wherein the feedback current $I_{fb}(n)$ is obtained by a multiplexer 63 multiplexing a scale factor H (which is an feedback coefficient). Then, utilizing a multiplexer 64 to multiply the error component $(I_{ref}(n)-I_{fb}(n))$ with a coefficient $K_p$, and adding with the feedforward component $(I_{ref}(n+1)-I_{ref}(n))$ to obtain the current variation $\Delta i_{LS}(n+1)$ by an adder 65, as characterized by equation (6). Further, utilizing a multiplexer 66 to multiply the current variation $\Delta i_{LS}(n+1)$ with a coefficient $G_C$, then an adder 67 outcomes the duty ratio D(n+1) of the single-phase three-wire inverter 14 in the next duty cycle, as characterized by equation (5) or (11), wherein equation (5) and equation

(11) are respectively adapted to the grid-connection mode and the rectification mode. Then, utilizing a transfer function $G_P$ of a multiplexer 68 to obtain the inductor's current $i_L(n+1)$ of the single-phase three-wire inverter 14 in the next duty cycle according to the duty ratio D(n+1).

Figure 7A:
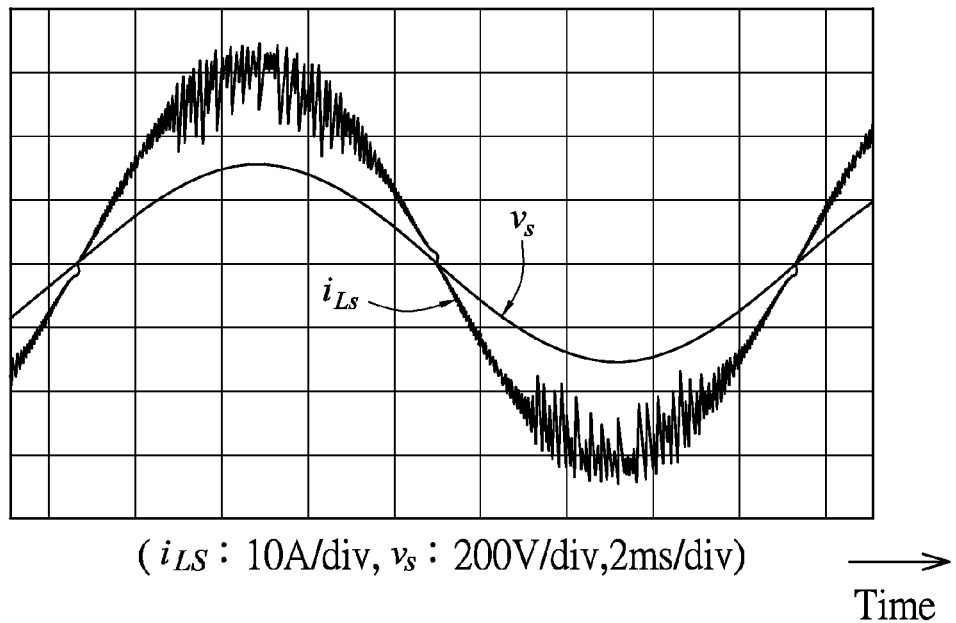
FIG. 7A shows a waveform diagram of an alternating current and a corresponding voltage without considering the inductor variance conventionally.
Figure 7B:
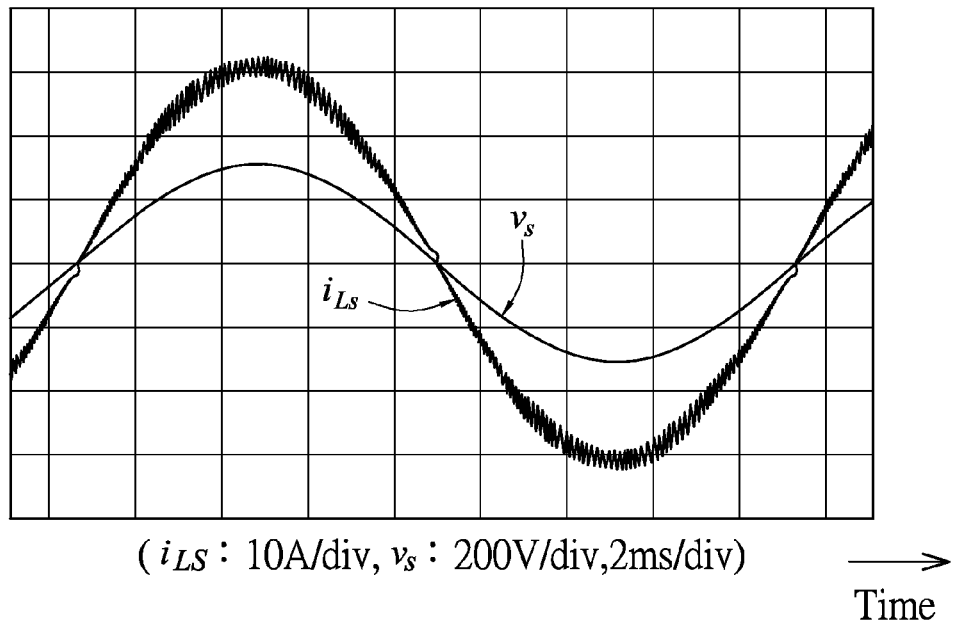
FIG. 7B shows a waveform diagram of an alternating current and a corresponding voltage of a single-phase three-wire power control system according to an embodiment of the instant disclosure.

As mentioned above, the prior art utilizes a quite large compensation or makes overdesign for the inductor to solve the problem of inductor variation, wherein the surplus compensation would result in the risk of divergent for the system, and the overdesign of the inductor would increase unnecessary cost and volume. Comparing with the prior art, this invention provides a control scheme which allows the inductance variation for controlling the single-phase three-wire inverter. This embodiment introduces the inductance variation into the control scheme. When the control scheme takes into account the inductance variances, large variation of inductance would be allowed, and the speed response and system stability will be improved, meanwhile overdesign for the inductor will be avoided in order to reduce the volume of the inductor and related cost. As shown in FIG. 7A and FIG. 7B, FIG. 7A shows a waveform diagram of an alternating current and a corresponding voltage without considering the inductor variance conventionally, FIG. 7B shows a waveform diagram of an alternating current and a corresponding voltage of a single-phase three-wire power control system according to an embodiment of the instant disclosure.

Figure 8A:
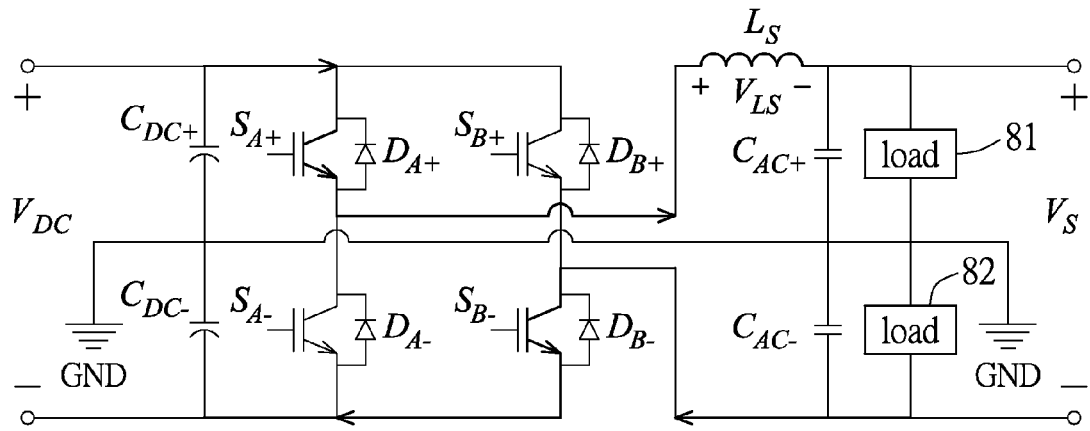
FIG. 8A shows a perspective diagram of a single-phase three-wire inverter operating during a positive half-cycle in a voltage-control mode according to an embodiment of the instant disclosure.
Figure 8B:
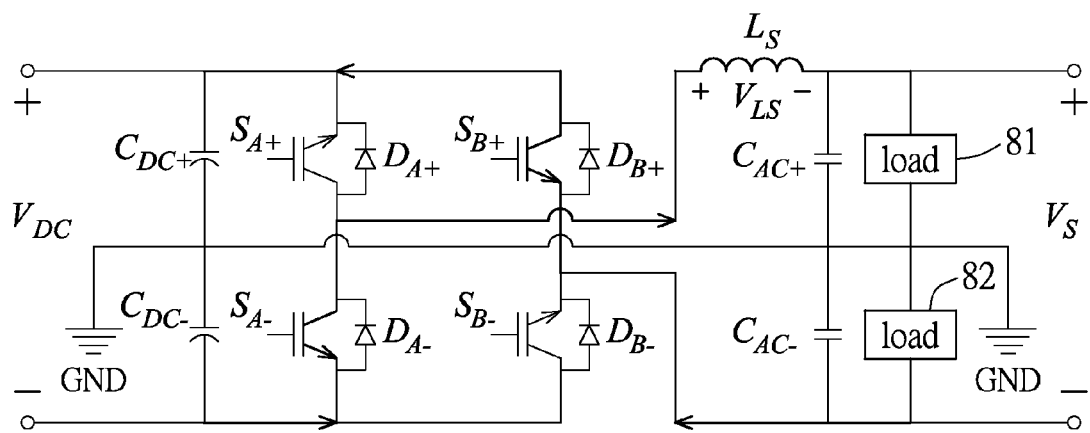
FIG. 8B shows a perspective diagram of a single-phase three-wire inverter operating during a negative half-cycle in a voltage-control mode according to an embodiment of the instant disclosure.

Please refer to FIG. 8A and FIG. 8B, FIG. 8A shows a perspective diagram of a single-phase three-wire inverter operating during a positive half-cycle in a voltage-control mode according to an embodiment of the instant disclosure, FIG. 8B shows a perspective diagram of a single-phase three-wire inverter operating during a negative half-cycle in a voltage-control mode according to an embodiment of the instant disclosure. When the utility grid fails, then the system goes to the voltage-control mode, at this moment the system functions as a UPS, as shown in FIG. 2C.

In the voltage-control mode, the processor 17 utilizes load impedance estimation and iterative learning control to compensate the output voltage $V_S$ except for considering the conditions of exciting the inductor and demagnetizing the inductor. The DC link provides power to the load through the single-phase three-wire inverter 14, meanwhile a relay on the neutral line (the third power line 13) is in cooperated, and the load is presented by loads 81, 82 shown in FIG. 8A (and FIG. 8B). As shown in FIG. 8A, while defining that the current flows from the left side of the inductor $L_S$ to the right side of the inductor $L_S$ is positive, the duty ratio of the power switch $S_{A+}$ and the power switch $S_{B-}$ is the duty ratio D, the duty ratio of the power switch $S_{A-}$ and the power switch $S_{B+}$ is the complementary (1-D) of the duty ratio D, and when the power switch $S_{A+}$ and the power switch $S_{B-}$ are conducted, the power switch $S_{A-}$ and the power switch $S_{B+}$ are cutoff, which causes the inductor $L_S$ to be excited, then the voltage drop $V_{LS}$ across the inductor $L_S$ is equal to $V_{DC}-V_S$. Otherwise, when the power switch $S_{A|}$ and the power switch $S_{B-}$ are cutoff, the power switch $S_{A-}$ and the power switch $S_{B|}$ are conducted, which causes the inductor $L_S$ to be demagnetized, then the voltage drop $V_{LS}$ across the inductor $L_S$ is equal to $-(V_{DC}+V_S)$. The relationships of voltage across the inductor and the current of the inductor are shown in equations (13) and (14), wherein D is the duty ratio.

$$V_{DC} - V_S = L_S \frac{\Delta i_{L1}}{DT} \quad (13)$$

$$-(V_{DC} + V_S) = L_S \frac{\Delta i_{L2}}{(1-D)T} \quad (14)$$

Further, referring to equation (3), the total variation of the inductor current in the present cycle is the current variation of exciting the inductor added with the current variation of the demagnetized inductor, thus equation (13) and equation (14) can be taken into equation (3) to obtain equation (15), wherein T is a switching period, $L_S$ is an inductance.

$$\Delta i_L = \frac{T}{L_S}[(2D-1)V_{DC} + (-V_S)] \quad (15)$$

Further, solving equation (15) for obtaining the duty ratio D, and then the duty radio D(n+1) of the next cycle is characterized by equation (16).

$$D(n+1) = \frac{1}{2} + \frac{V_S}{2V_{DC}} + \frac{L_S \Delta i_L}{2V_{DC}T} \quad (16)$$

Figure 9A:
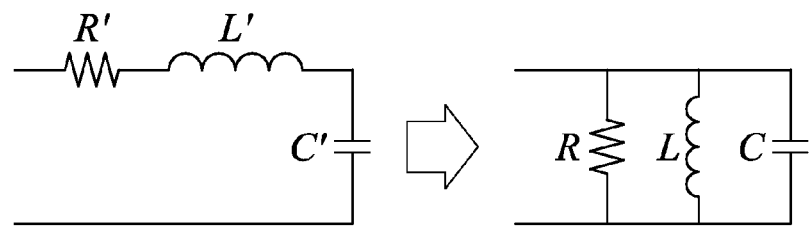
FIG. 9A shows a circuit diagram of an equivalent circuit of a load according to an embodiment of the instant disclosure.
Figure 9B:
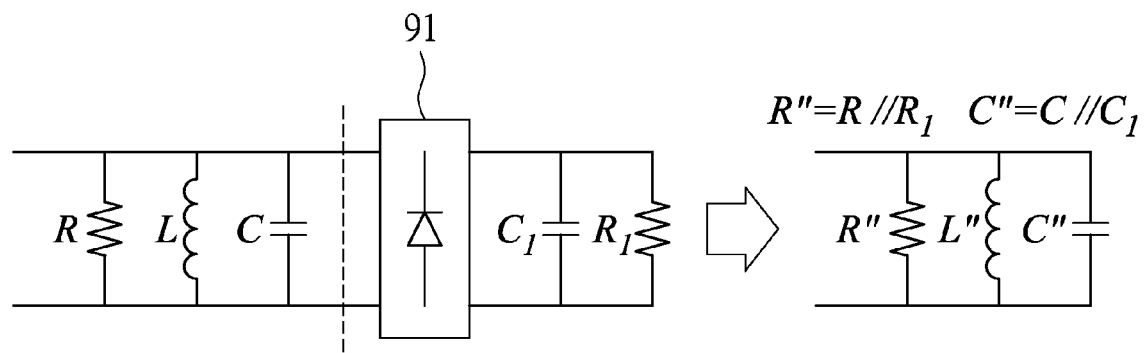
FIG. 9B shows a circuit diagram of an equivalent circuit of another load according to an embodiment of the instant disclosure.

Further, as shown in FIG. 9A, the load can be presented by a resistor R', an inductor L' and a capacitor C' connected in series, and can be equivalent to a load resistor R, a load inductor L and a load capacitor C connected in parallel, such that the load can be the RLC load parallelly connected with a rectification load. When load comprises a nonlinear load, a diode 91 shown in FIG. 9B for example, and when the diode 91 is conducted, the load can be equivalent to a parallel connected R"L"C" load, R"=R//$R_1$, C"=C//$C_1$. According to the characteristic of different load having different current variation, the current variation generated by the load of the next cycle could be characterized by equation (17).

$$\Delta i(n+1) = \Delta i_R + \Delta i_C + \Delta i_L \quad (17)$$

The current variation $\Delta i(n+1)$ generated by the load of the next cycle is the summation of the following three current variations due to three types of loads, $\Delta i_R$, $\Delta i_L$, $\Delta i_C$, wherein $\Delta i_R$ is the current variation passing the resistive load which can be derived in the following:

$$\Delta i_R(n+1) = i_R(n+1) - i_R(n) \quad (18)$$
$$= \frac{\Delta v + v}{R} - \frac{v}{R}$$
$$= \frac{v(n+1) - v(n)}{R}$$

After arrangement, the current variation of the resistive load can be characterized by equation (19).

$$\Delta i_R(n+1) = \frac{v_{ref}(n+1) - v_{fb}(n)}{R} \quad (19)$$

Wherein the output voltage v(n+1) of the next cycle is presented by the reference voltage $V_{ref}(n+1)$, the output voltage v(n) is presented by the feedback voltage $V_{fb}(n)$.

$\Delta i_L$ is the current variation passing through the capacitive load and can be derived in the following:

$$\Delta i_L(n+1) = i_L(n+1) - i_L(n) \tag{20}$$

wherein $$i_L(n+1) = \frac{1}{L}\left(\int_0^{(n+1)T} v\,dt + \int_{nT}^{(n+1)T} \frac{\Delta v}{2}\,dt\right) \tag{21}$$

$$= \frac{1}{L}\left(\int_0^{nT} v\,dt + \int_{nT}^{(n+1)T} v\,dt + \int_{nT}^{(n+1)T} \frac{\Delta v}{2}\,dt\right)$$

additionally, $$i_L(n) = \frac{1}{L}\int_0^{nT} v\,dt \tag{22}$$

Taking equation (22) into equation (21) and rearranging the equation to obtain equation (23).

$$\Delta i_L(n+1) = \frac{v_{ref}(n+1) + v_{fb}(n)}{2L}T \tag{23}$$

Further, $\Delta i_C$ is the current variation passing through capacitive load which can be derived in the following:

$$\Delta i_C(n+1) = i_C(n+1) - i_C(n) \tag{24}$$

The derivation utilizes v(n+3/2), v(n+1/2) and v(n−1/2) which can be calculated in the following:

$$v\left(n+\frac{3}{2}\right) = \frac{v(n+2) + v(n+1)}{2} \tag{25}$$

$$v\left(n+\frac{1}{2}\right) = \frac{v(n+1) + v(n)}{2} \tag{26}$$

$$v\left(n-\frac{1}{2}\right) = \frac{v(n) + v(n-1)}{2} \tag{27}$$

According to the relation between capacitance, the voltage and the current which is i =Cdv/dt, the voltage variation should be taken into account while calculating the current value, referring to equation (28) and equation (29).

$$\Delta v(n+1) = v(n+3/2) - v(n+1/2) \tag{28}$$

$$\Delta v(n) = v(n+1/2) - v(n-1/2) \tag{29}$$

Utilizing $\Delta v(n+1)$ and $\Delta v(n)$ to calculate $i_C(n+1)$ and $i_C(n)$ as following:

$$i_C(n+1) = \frac{C \cdot \Delta v(n+1)}{T} \tag{30}$$

$$i_C(n) = \frac{C \cdot \Delta v(n)}{T} \tag{31}$$

Then, taking equations (20) and (31) into equation (24) to obtain equation (32):

$$\Delta i_C(n+1) = \frac{C}{2T}[V_{ref}(n+2) - V_{ref}(n+1) - V_{fb}(n) + V_{fb}(n-1)] \tag{32}$$

According to the above mentioned derivation, equations (19), (23) and (32) can be taken into equation (17), and equation (33) can be obtained after rearrangement:

$$\Delta i_{(\bullet)}(n+1) = \frac{V_{ref}(n+1) - V_{fb}(n)}{R} + \tag{33}$$

$$C\frac{[V_{ref}(n+2) - V_{ref}(n+1)] - [V_{fb}(n) - V_{fb}(n-1)]}{2T} + \frac{V_{ref}(n+1) + V_{fb}(n)}{2L}T$$

In order to make the output voltage can reach the preset sine wave voltage (e.g. the voltage is 100 Vrms), we apply a current tracking control method to the voltage-control mode, and the system has to identify these three parameters R, L and C at any time, thus three simultaneous equations are utilized in calculations, referring to following equations (34), (35) and (36).

$$\Delta i(n) = \frac{V_{ref}(n) - V_{fb}(n-1)}{R} + \tag{34}$$

$$C\frac{[V_{ref}(n+1) - V_{ref}(n)] - [V_{fb}(n-1) - V_{fb}(n-2)]}{2T} + \frac{V_{ref}(n) + V_{fb}(n-1)}{2L}T$$

$$\Delta i(n-1) = \frac{V_{ref}(n-1) - V_{fb}(n-2)}{R} + \tag{35}$$

$$C\frac{[V_{ref}(n) - V_{ref}(n-1)] - [V_{fb}(n-2) - V_{fb}(n-3)]}{2T} + \frac{V_{ref}(n-1) + V_{fb}(n-2)}{2L}T$$

$$\Delta i(n-2) = \frac{V_{ref}(n-2) - V_{fb}(n-3)}{R} + \tag{36}$$

$$C\frac{[V_{ref}(n-1) - V_{ref}(n-2)] - [V_{fb}(n-3) - V_{fb}(n-4)]}{2T} + \frac{V_{ref}(n-2) + V_{fb}(n-3)}{2L}T$$

These above three equations can be used to solve the values of R, L and C according to Cramer's rule. Additionally, the calculation for the duty ratio is not only adjusted according to the different types of the load, iterative learning control with equation (37) is also introduced.

$$d_i(n+1) = k_{p2}(n+1)\left\{\frac{L_S(n+1)}{L_{max}}[v_{ref}(n+1) - v'_{fb}(n+1)]\right\} \tag{37}$$

wherein $V_{ref}$ is the reference voltage built by the system, $V'_{fb}$ is the feedback voltage of the previous cycle (of the utility grid), and the control gain $k_{p2}$ can be characterized by equation (38).

$$k_{p2}(n+1) = k'_{p2}(n+1) + k_{p0}[v_{ref}(n+1) - v'_{fb}(n+1)] \tag{38}$$

$k'_{p2}$ is the control gain of the previous cycle of utility grid (corresponding to the switching cycle), $k_{p2}$ is the reaction result according to the gain of the previous cycle and the error component, and $k_{p0}$ is the preset initial gain. While introducing the iterative learning control, the error of output voltage of the system in a steady state and the total harmonic distortion can be reduced, and the control block is depicted in FIG. 10, wherein the duty ratio of the next cycle is $$D(n+1) = \frac{1}{2} + \frac{V_{ref}(n+1)}{2V_{dc}}.$$

Figure 10:
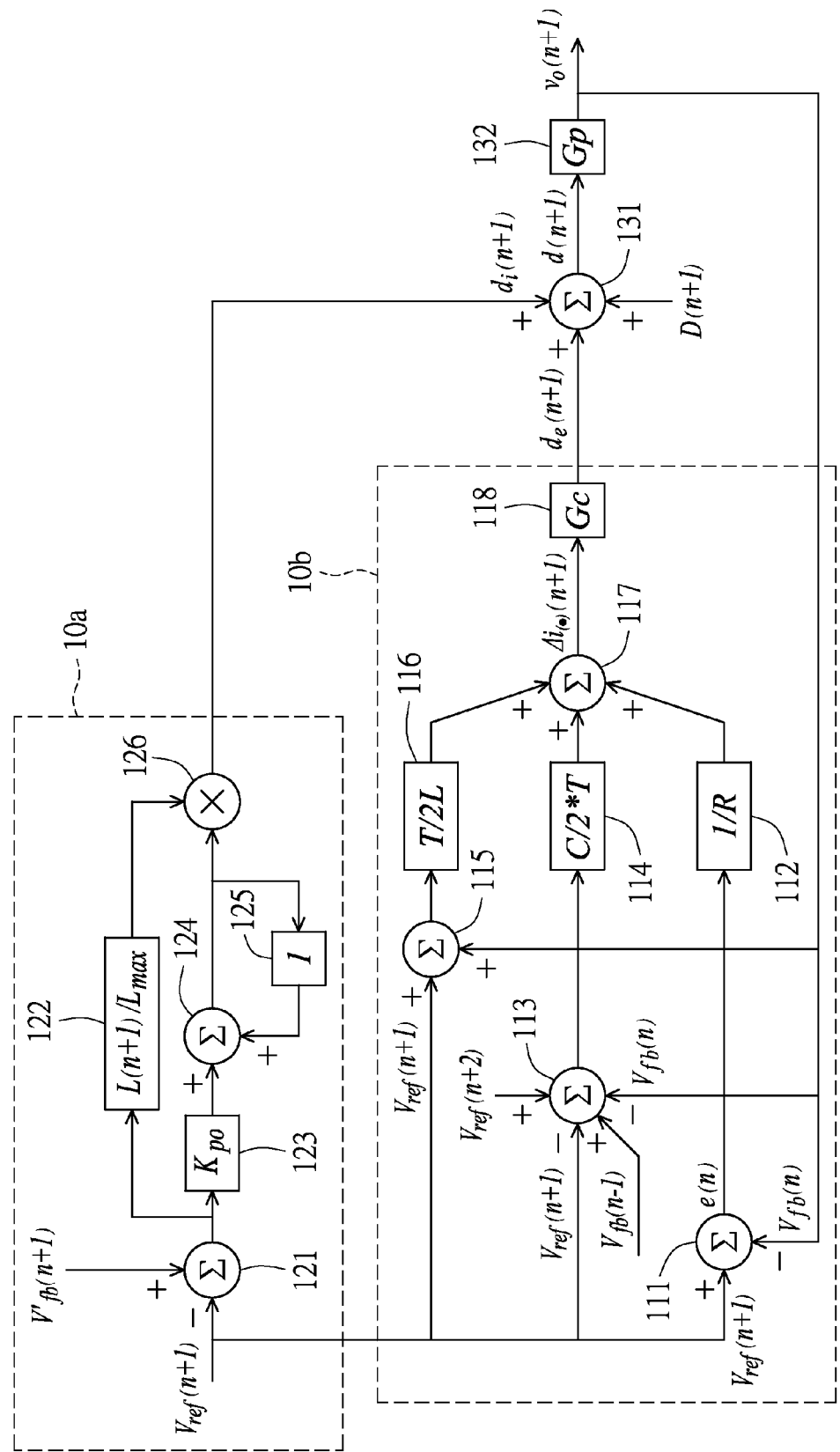
FIG. 10 shows a control block diagram of a single-phase three-wire inverter operating in a voltage-control mode according to an embodiment of the instant disclosure.

The control block shown in FIG. 10 is also implemented by the processing unit 17 as detailed below. Referring to equations (33), (37) in conjunction with FIG. 10, the control block comprises a sub-block 10b for load impedance estimation and a sub-block 10a for iterative learning. Firstly, regarding for load impedance estimation, utilizing an adder 111 to subtract the feedback current $I_{fb}(n)$ of the present cycle from the reference current $I_{ref}(n+1)$ of the next cycle to obtain the feedforward component e(n) (which is $(I_{ref}(n+1)-I_{ref}(n))$), and a multiplexer 112 multiplies the feedforward component e(n) with 1/R to obtain the current variation of the resistive load, as shown in equation (19). Then, for the current variation of the capacitive load, an adder 113 subtracts the reference current $I_{ref}(n+1)$ of the next cycle and the feedback current $I_{fb}(n)$ of the present cycle from the reference current $I_{ref}(n+2)$ of the next two cycle, and adding the feedback current $I_{fb}(n-1)$ of the previous cycle, then utilizing a multiplexer 114 to multiplies the outcome of the adder 113 with C/2T, as shown in equation (32). Then, for the current variation of the inductive load, an adder 115 subtracts the feedback current $I_{fb}(n)$ of the present cycle from the reference current $I_{ref}(n+1)$ of the next cycle, then utilizing a multiplier 116 to multiplies the outcome of the adder 115 with T/2L. Then, an adder 117 adds the outcomes of the multipliers 112, 114 and 116 to obtain the total current variation $\Delta i_{(\cdot)}(n+1)$ due to the load in the next cycle, as depicted in equation (33). Then the total current variation $\Delta i_{(\cdot)}(n+1)$ can be multiplied by a coefficient $G_C$ to obtain the variation $d_e(n+1)$ of the duty ratio estimated from the load.

Secondly, regarding for iterative learning control, an adder 121 subtrates the reference reference voltage $V_{ref}(n+1)$ of the next cycle from the feedback $V'_{fb}(n+1)$ of the next cycle, and utilizing multipliers 122, 123, 125 and 126 and an adder 124 to obtain the variation $d_i(n+1)$ of the duty ratio for iterative learning. An adder 131 addes the variation $d_e(n+1)$ of the duty ratio estimated from the load, the variation $d_e(n+1)$ of the duty ratio for iterative learning and the duty ratio D(n+1) of the next cycle, then the single-phase three-wire inverter 14 operates according to the duty cycle d(n+1) to obtain an AC voltage $v_O(n+1)$ of the next cycle which is converted through a transfer function $G_p$ of a multiplier 132.

In short, when the single-phase three-wire power control system operates in the voltage-control mode, the processing unit 17 not only calculates the total current variation of the inductor to obtain the duty ratio D(n+1) according to the inductor's variation, the processing unit 17 also utilizes the reference voltage $V_{ref}$ and the feedback voltage $V_{fb}$ to obtain the total current variation $\Delta i_{(\cdot)}$ due to the load so as to obtain the variatoin $d_e(n+1)$ of the duty ratio estimated from the load, in which the load is equivalent to the resistive load R, the inductive load L and the capacitive load C connected in parallel and the total current variation $\Delta i_{(\cdot)}$ due to the load is the summation of the current variation of the resistive load, the current variation of the resistive load and the current variation of the capacitive load depicted in equation (33). Further, the processing unit 17 also calculates the variatoin $d_i(n+1)$ of the duty ratio for iterative learning The processing unit 17 adds the duty ratio D(n+1), the variation $d_e(n+1)$ of the duty ratio estimated from the load and the variation $d_i(n+1)$ of the duty ratio for iterative learning to control the outputted AC voltage $v_O(n+1)$.

Figure 11:
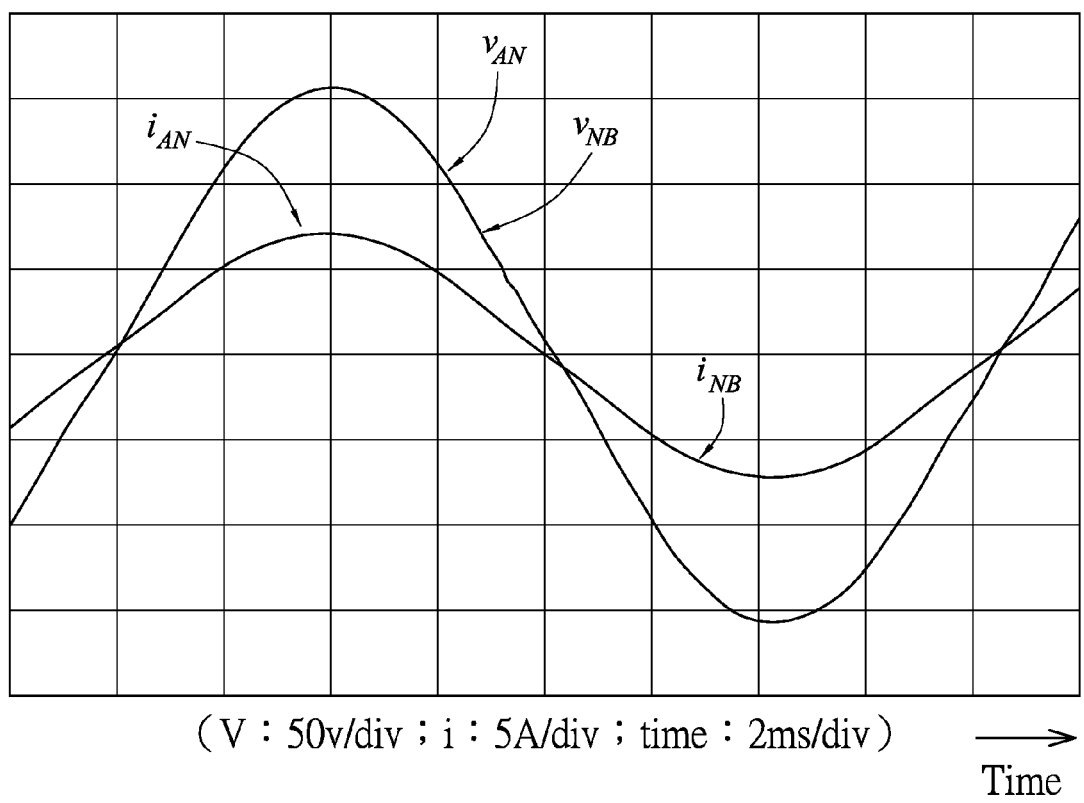
FIG. 11 shows a waveform diagram of an output voltage and an output current when a single-phase three-wire inverter depicted in FIG. 10 operating in a voltage-control mode is applied to a resistive load.

Referring to FIG. 11 showing a waveform diagram of an output voltage and an output current when a single-phase three-wire inverter depicted in FIG. 10 operating in a voltage-control mode with total power of 1.1 kW is applied to a resistive load. The output voltages are $V_{AN}$ and $V_{NB}$, wherein the voltage $V_{AN}$ is the voltage across the first power line 11 and the third power line 13, and the voltage $V_{NB}$ is the voltage across the third power line 13 and the second power line 12. The current $i_{AN}$ is the current flowing through the load connected between the first power line 11 and the third power line 13. The current $i_{NB}$ is the current flowing through the load connected between the third power line 13 and the second power line 12. Further, for the resistive load, the total harmonic distortions are 2.458%, 2.946% and 3.321% while utilizing control block shown in FIG. 10 to operate the single-phase three-wire inverter in 1.1 kW, 2.2 kW and 3.3 kW respectively. The specification requirement of total harmonic distortion for the uninterruptible power supply (UPS) is below 5%, in general, the total harmonic distortion of the conventional circuit is about 4%. The single-phase three-wire inverter of this embodiment can obtain lower total harmonic distortion.

Figure 12:
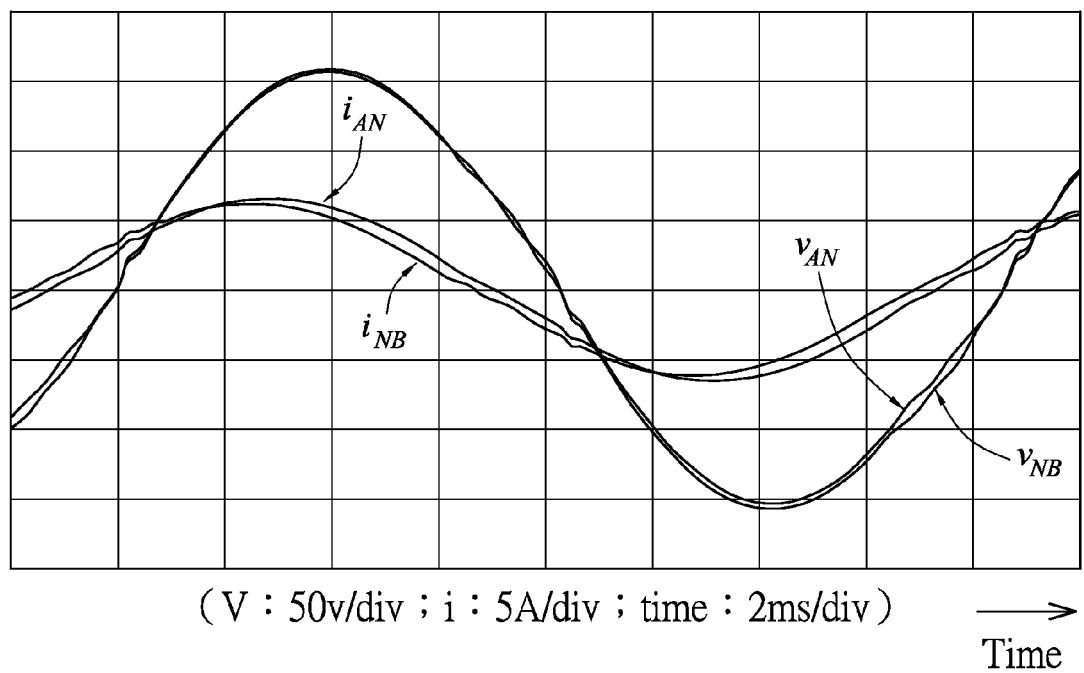
FIG. 12 shows a waveform diagram of an output voltage and an output current when a single-phase three-wire inverter depicted in FIG. 10 operating in a voltage-control mode is applied to a capacitive load.

Referring to FIG. 12 showing a waveform diagram of an output voltage and an output current when a single-phase three-wire inverter depicted in FIG. 10 operating in a voltage-control mode with total power of 1.02 kVA is applied to a capacitive load. For the capacitive load, the total harmonic distortions are 2.590%, 2.955% and 3.305% while utilizing control block shown in FIG. 10 to operate the single-phase three-wire inverter in 1.02 kVA, 1.88 kVA and 2.86 kVA respectively. In general, the total harmonic distortion of the conventional circuit is about 4%. The single-phase three-wire inverter of this embodiment can obtain lower total harmonic distortion.

Figure 13:
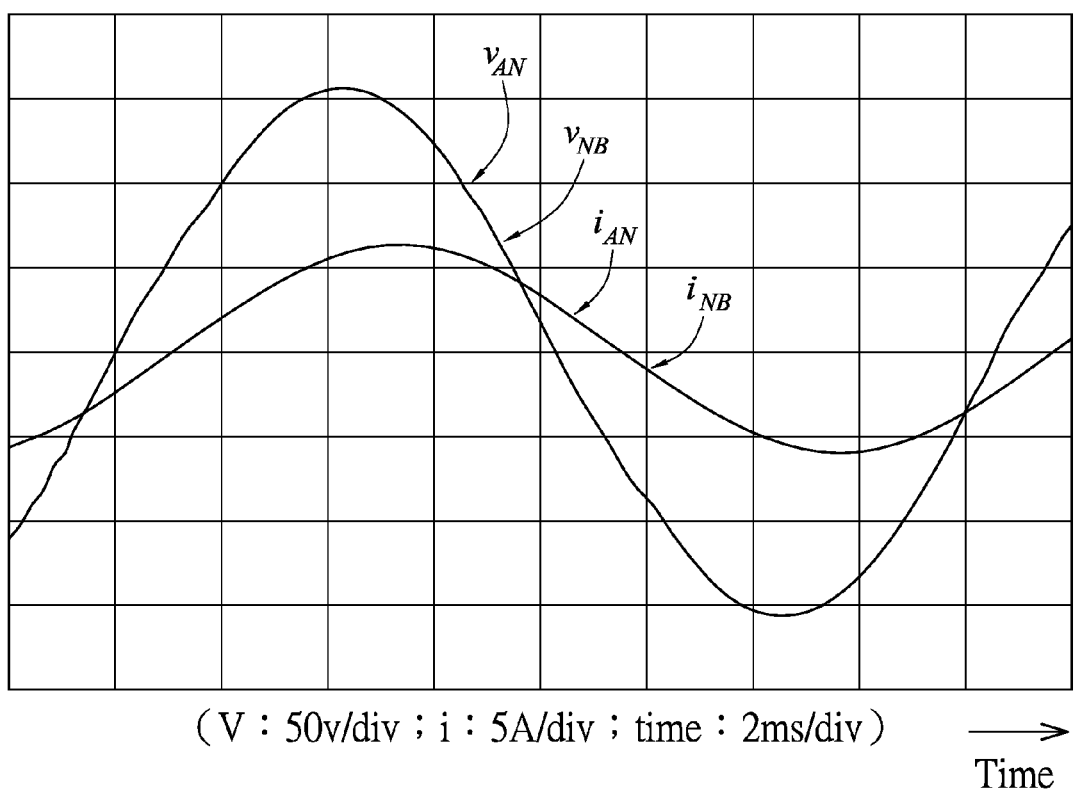
FIG. 13 shows a waveform diagram of an output voltage and an output current when a single-phase three-wire inverter depicted in FIG. 10 operating in a voltage-control mode is applied to an inductive load.

Referring to FIG. 13 showing a waveform diagram of an output voltage and an output current when a single-phase three-wire inverter depicted in FIG. 10 operating in a voltage-control mode with total power of 1.04 kVA is applied to an inductive load. For the inductive load, the total harmonic distortions are 2.375%, 2.949% and 3.268% while utilizing control block shown in FIG. 10 to operate the single-phase three-wire inverter in 1.04 kVA, 1.81 kVA and 2.72 kVA respectively. In general, the total harmonic distortion of the conventional circuit is about 4%. The single-phase three-wire inverter of this embodiment can obtain lower total harmonic distortion.

[An Embodiment of a Power Control Method]

Figure 14:
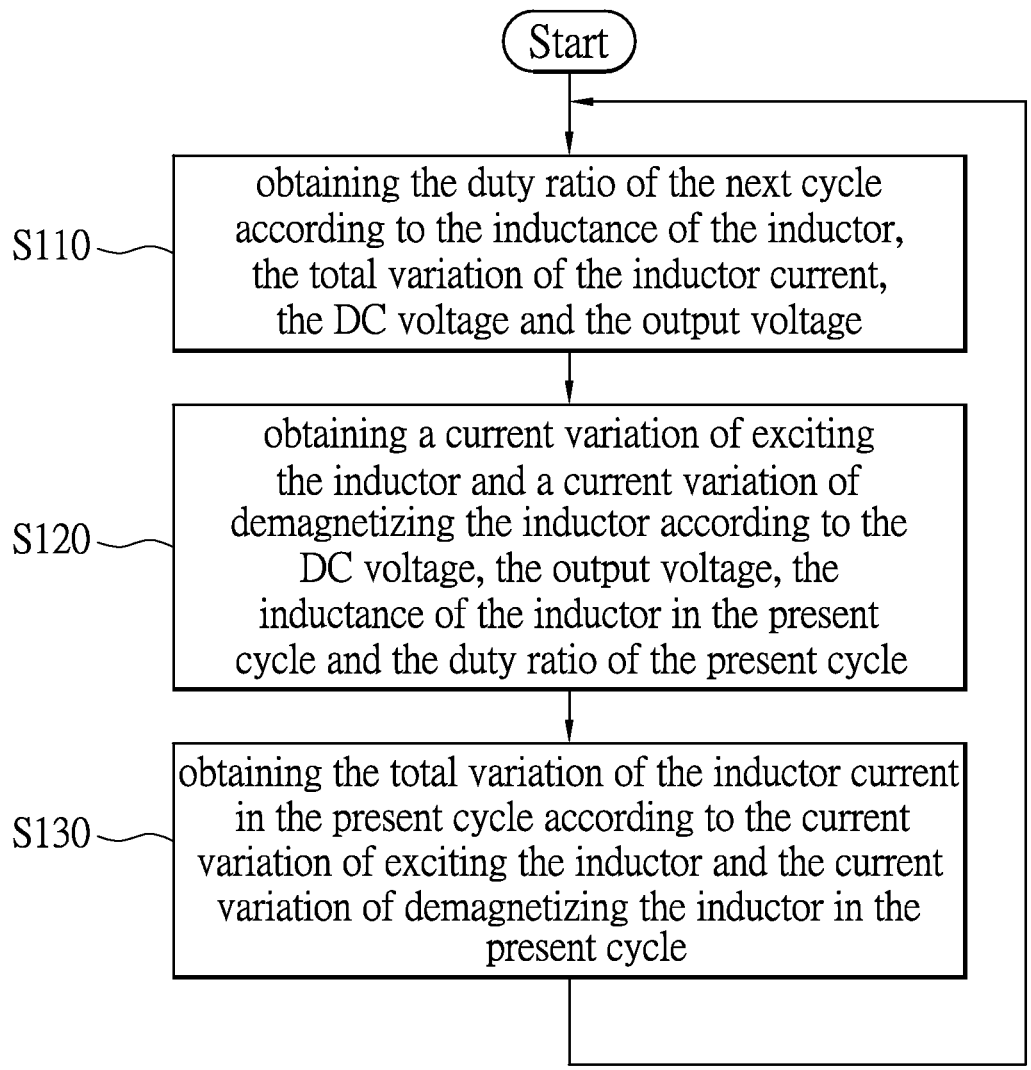
FIG. 14 shows a flow chart of a power control method according to an embodiment of the instant disclosure.

Please refer to FIG. 14 in conjunction with FIG. 2A, FIG. 2B, FIG. 2C and FIG. 3, FIG. 14 shows a flow chart of a power control method according to an embodiment of the instant disclosure. The power control method for controlling the single-phase three-wire power control system (which is the single-phase three-wire emergency power system 1) shown in FIG. 3. The single-phase three-wire power control system has the single-phase three-wire inverter 14. The single-phase three-wire inverter 14 is coupled between the DC power supply device 2 and the AC power source 4 (shown in FIG. 2A) for converting the DC voltage $V_{DC}$ of the DC power supply device 2 to the output voltage $V_S$ and integrating the electricity of the DC power supply device 2 to the AC power source 4 through the inductor $L_S$ of the first power line 11, the second power line 12 and the third power line 13. The single-phase three-wire inverter 14 has a first half-bridge DC-AC power converter and a second half-bridge DC-AC power converter parallel-coupled to each other. Details of the circuit can be referred to the previous embodiment. The power control method comprises following steps. First, in step S110, obtaining the duty ratio D(n+1) of the next cycle according to the inductance $L_S$ of the inductor, the total variation $\Delta i_{LS}$ of the inductor current, the DC voltage $V_{DC}$ and the output voltage $V_S$. It is worth mentioning that the step S110 may comprise determining the single-phase three-wire inverter to operate in the grid-connection mode, the rectification mode or the voltage-control mode. Implementation of determining the mode switching of the single-phase three-wire inverter may be achieved in a variety of ways. The user may configure the mechanism of the mode switching arbitrarily as needed. For example, the user may manually control the operation mode, or utilize a sensor to the sense the voltage and current of the AC power source to be the basis for auto-switching of the operation mode, and an artisan of ordinary skill in the art will easily appreciate the implementation manner of the mode switching, thus there is no need to go into details.

Then, in step S120, obtaining a current variation $\Delta i_{L1}$ of exciting the inductor and a current variation $\Delta i_{L2}$ of demagnetizing the inductor according to the DC voltage $V_{DC}$, the output voltage $V_S$, the inductance $L_S$ of the inductor in the present cycle and the duty ratio D(n) of the present cycle. Then, in step S130, obtaining the total variation $\Delta I_{LS}$ of the inductor current in the present cycle according to the current variation $\Delta I_{L1}$ of exciting the inductor and the current variation $\Delta I_{L2}$ of demagnetizing the inductor in the present cycle. After step S130 is finished, repeat step S110 again for calculating the duty ratio after the next cycle.

Specifically, when the single-phase three-wire inverter 14 operates in the grid-connection mode, the step S110 utilizes equation (5) to calculate the duty ratio D(n+1) of the next cycle. When the single-phase three-wire inverter 14 operates in the rectification mode, the step S110 utilizes equation (11) to calculate the duty ratio D(n+1) of the next cycle.

Further, when the single-phase three-wire inverter 14 operates in the voltage-control mode, the step S110 obtaining the total current variation $\Delta i(\bullet)$ of the load according to a reference voltage $V_{ref}$ and a feedback voltage $V_{fb}$, equalizing the load as a resistive load R, a inductive load L and a capacitive load C connected in parallel, wherein the total current variation $\Delta i(\bullet)$ of the load is the summation of the current variation of the resistive load R, the current variation of the inductive load L and the current variation of the capacitive load C as indicated in equation (33), then calculating the variation $d_e(n+1)$ of the duty ratio estimated from the load according to the total current variation $\Delta i(\bullet)$ of the load. Further, utilizing the iterative learning control to calculate the variation $d_i(n+1)$ of the duty ratio for iterative learning, in order to compensate the output voltage $V_S$, wherein the variation $d_i(n+1)$ of the duty ratio for iterative learning is obtained from aforementioned equation (37). Finally, utilizing the duty ratio D(n+1), variation $d_e(n+1)$ of the duty ratio estimated from the load, and the variation $d_i(n+1)$ of the duty ratio for iterative learning to control the output AC voltage $v_O(n+1)$ (which is the output voltage $V_S$), referring to FIG. 10.

According to above descriptions, the offered single-phase three-wire power control system and control method introduce the variation of inductor into the control mechanism for effectively reducing the current oscillation and the current ripple as well as increasing the accuracy current tracking. Also, the control mechanism only needs one sampling to obtain the average of the feedback current, the processing time of the processing unit (e.g. a single-chip) can be reduced, and the switching noise occurred when turning-on and turning-off of the switches can be avoided. The single-phase three-wire power control system can switch operation modes comprising the grid-connection mode and the rectification mode according to the status of the AC power source. Further, the system can operates in the voltage-control mode when the AC power source (e.g. utility grid) fails, in which the single-phase three-wire power control system further utilizes the load impedance estimation and iterative learning control to compensate the output AC voltage.

Especially, in the voltage-control mode, the single-phase three-wire power control system of the mentioned embodiment introduces dead-beat control while utilizing real-time voltage sampling and current sampling to dynamically estimate the impedance of the load, and further integrates the iterative learning control to update the upper-limit and the lower-limit of the impedance for preciously tracking the reference voltage and reducing the voltage distortions. The mentioned control mechanism achieves cycle by cycle control for increasing the response speed, thus good power quality can be obtained even if the load is varying. Additionally, the inductance of the inductor can be minimized and optimized by introducing the variation of the inductance into the control mechanism, in order to avoid using excessive large inductance which increases unnecessary cost. Finally, the control method only needs one sampling to obtain the average of the feedback current, the processing time of the single-chip can be reduced, and the switching noise occurred when turning-on and turning-off of the switches can be avoided.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A single-phase three-wire power control system integrating the electricity of a DC power supply device to an AC power source through an inductor of a first power line, a second power line and a third power line, comprising:
   a single-phase three-wire inverter, coupled between the DC power supply device and the AC power source, converting a DC voltage of the DC power supply device to an output voltage, wherein the single-phase three-wire inverter has a first half-bridge DC-AC power converter and a second half-bridge DC-AC power converter parallel-coupled to each other;
   a driving unit, coupled to the single-phase three-wire inverter;
   a sampling unit, coupled to the inductor, sampling an inductor current of the inductor; and
   a processing unit, coupled to the driving unit and the sampling unit, controlling the single-phase three-wire inverter through the driving unit, obtaining the duty ratio of a next cycle according to the inductance of the inductor, the total variation of the inductor current, the DC voltage and the output voltage;
   wherein the processing unit obtains a current variation of exciting the inductor and a current variation of demagnetizing the inductor according to the DC voltage of a present cycle, the output voltage, the inductance of the inductor and the duty ratio of the present cycle, and obtains the total variation of the inductor current in the present cycle according to the current variation of exciting the inductor and the current variation of the demagnetized inductor in the present cycle.

2. The single-phase three-wire power control system according to claim 1, wherein the first half-bridge DC-AC power converter and the second half-bridge DC-AC power converter are both bipolarized switched; the first-bridge DC-AC power converter is connected to the first power line, the second-bridge DC-AC power converter is connected to the second power line; the processing unit utilizes feed-forward current control to obtain the total variation of the inductor current according to a reference current and a feedback current of the present cycle, wherein the feedback current is the inductor current multiplied with a scale factor.

3. The single-phase three-wire power control system according to claim 1, wherein the three-wire power control system operates in an grid-connection mode and a rectification mode, wherein when the three-wire power control system operates in the grid-connection mode, the duty ratio of the next cycle is characterized by the equation:

$$D(n+1) = \frac{1}{2} + \frac{V_S}{2V_{DC}} + \frac{L_S \Delta i_L}{2V_{DC}T};$$

wherein $L_S$ is an inductance of the inductor, $V_S$ is a voltage of the AC power source, $V_{DC}$ is a DC voltage of the power supply device, T is a period of the cycle, $\Delta i_L$ is the total variation of the inductor current, n is an integer;

wherein when the single-phase three-wire power control system operates in the rectification mode the duty ratio of the next cycle is characterized by the equation:

$$D(n+1) = \frac{1}{2} - \frac{V_S}{2V_{DC}} + \frac{L_S \Delta i_L}{2V_{DC}T};$$

wherein $L_S$ is an inductance of the inductor, $V_S$ is a voltage of the AC power source, $V_{DC}$ is a DC voltage of the power supply device, T is a period of the cycle, $\Delta i_L$ is the total variation of the inductor current, n is an integer.

4. The single-phase three-wire power control system according to claim 1 wherein the single-phase three-wire power control system operates in a voltage-control mode, the processing unit obtains the total current variation of a load according to a reference voltage and a feedback voltage, the load is equalized as a resistive load, a inductive load and a capacitive load connected in parallel, the total current variation of the load is the summation of the current variation of the resistive load, the current variation of the inductive load and the current variation of the capacitive load.

5. The single-phase three-wire power control system according to claim 4, wherein the total variation of the load is characterized by the equation:

$$\Delta i(n+1) = \frac{V_{ref}(n+1) - V_{fb}(n)}{R} + $$
$$C\frac{[V_{ref}(n+2) - V_{ref}(n+1)] - [V_{fb}(n) - V_{fb}(n-1)]}{2T} + \frac{V_{ref}(n+1) + V_{fb}(n)}{2L}T;$$

wherein $V_{ref}$ is a reference voltage, $V_{fb}$ is a feedback voltage, T is a period of the cycle, R, L and C respectively are the equalized resistive load, the inductive load and the inductive load of the load, n is an integer;

wherein the processing unit utilizes Cramer's rule to solve R, L and C.

6. The single-phase three-wire power control system according to claim 4, wherein the processing utilizes iterative learning control to compensate the output voltage, wherein the variation of the duty ratio for the iterative learning is characterized by the equation:

$$d_i(n+1) = k_{p2}(n+1)\left\{\frac{L_S(n+1)}{L_{max}}[v_{ref}(n+1) - v'_{fb}(n+1)]\right\};$$

wherein $L_S$ is an inductance of the inductor, $L_{max}$ is a maximized inductance of the inductor, $V_{ref}$ is the reference voltage, $V_{fb}$ is the feedback voltage of a previous cycle, and $k_{p2}$ is characterized by the equation;

$$k_{p2}(n+1) = k'_{p2}(n+1) + k_{p0}[v_{ref}(n+1) - v'_{fb}(n+1)];$$

wherein $k_{p2}$ is a corresponding control gain of the previous cycle, $k_{p0}$ is an initial gain as predetermined, n is an integer.

7. A power control method for controlling a single-phase three-wire power control system, the single-phase three-wire power control system having a single-phase three-wire inverter, the single-phase three-wire inverter is coupled between a DC power supply device and a AC power source for converting a DC voltage of the DC power supply device to an output voltage and integrating the electricity of the DC power supply device to the AC power source through an inductor of a first power line, a second power line and a third power line, wherein the single-phase three-wire inverter has a first half-bridge DC-AC power converter and a second half-bridge DC-AC power converter parallel-coupled to each other, the power control method comprising:
  obtaining the duty ratio of a next cycle according to the inductance of the inductor, the total variation of the inductor current, the DC voltage and the output voltage;
  obtaining a current variation of exciting the inductor and a current variation of demagnetizing the inductor according to the DC voltage, the output voltage, the inductance of the inductor in a present cycle and the duty ratio of the present cycle; and
  obtaining the total variation of the inductor current in the present cycle according to the current variation of exciting the inductor and the current variation of demagnetizing the inductor in the present cycle.

8. The power control method according to claim 7, further comprising:
  when the single-phase three-wire inverter operates in an grid-connection mode, calculating the duty ratio of the next cycle according to following equation:

$$D(n+1) = \frac{1}{2} + \frac{V_S}{2V_{DC}} + \frac{L_S \Delta i_L}{2V_{DC}T};$$

where $V_S$ is a voltage of the AC power source, $V_{DC}$ is the DC voltage of the DC power supply device, T is a period of the cycle, $\Delta i_L$ is the variation of the inductor current, n is an integer; and when the single-phase three-wire inverter operates in an rectification mode, calculating the duty ratio of the next cycle according to following equation:

$$D(n+1) = \frac{1}{2} - \frac{V_S}{2V_{DC}} + \frac{L_S \Delta i_L}{2V_{DC}T}.$$

9. The power control method according to claim 8, further comprising:
  When the single-phase three-wire power control system operates in a voltage-control mode, obtaining the total current variation of a load according to a reference voltage and a feedback voltage, equalizing the load as a resistive load, a inductive load and a capacitive load connected in parallel, wherein the total current variation of the load is the summation of the current variation of the resistive load, the current variation of the inductive load and the current variation of the capacitive load, then calculating the variation of the duty ratio estimated from the load according to the total current variation of the load.

10. The power control method according to claim 9, wherein calculating the total current variation of the load according to the following equation:

$$\Delta i(n+1) = \frac{V_{ref}(n+1) - V_{fb}(n)}{R} + \\ [V_{ref}(n+2) - V_{ref}(n+1)] - \\ C \frac{[V_{fb}(n) - V_{fb}(n-1)]}{2T} + \frac{V_{ref}(n+1) + V_{fb}(n)}{2L} T;$$

wherein $V_{ref}$ is the reference voltage, $V_{fb}$ is the feedback voltage, T is a period of the cycle, R, L and C respectively are the equalized resistive load, the inductive load and the inductive load of the load, n is an integer;

wherein the processing unit utilizes Cramer's rule to solve R, L and C;

utilizes iterative learning control to composite the output voltage, wherein the variation of duty ratio for the iterative learning is characterized by the equation:

$$d_i(n+1) = k_{p2}(n+1)\left\{\frac{L_S(n+1)}{L_{max}}[v_{ref}(n+1) - v'_{fb}(n+1)]\right\};$$

wherein $L_S$ is an inductance of the inductor, $L_{max}$ is a maximized inductance of the inductor, $V_{ref}$ is the reference voltage, $V'_{fb}$ is the feedback voltage of a previous cycle, and $k_{p2}$ is characterized by the equation;

$$k_{p2}(n+1) = k'_{p2}(n+1) + k_{p0}[v_{ref}(n+1) - v'_{fb}(n+1)];$$

wherein $k'_{p2}$ is a corresponding control gain of the previous cycle, $k_{p0}$ is an initial gain as predetermined, n is an integer; and controlling the output voltage according to the duty ratio of the next cycle, the variation of the duty ratio estimated from the load, and the variation of duty ratio for iterative learning.

* * * * *